(12) United States Patent
Osakabe et al.

(10) Patent No.: US 7,832,191 B2
(45) Date of Patent: Nov. 16, 2010

(54) INTEGRATED GASIFICATION COMBINED CYCLE AND THE CONTROL METHOD

(75) Inventors: Michihiro Osakabe, Yokohama (JP); Yasuo Kozaki, Yokohama (JP); Hideaki Tanaka, Yokohama (JP); Shunsuke Mishima, Yokohama (JP); Tatsuo Furusako, Yokohama (JP); Kazuyuki Shoumura, Yokosuka (JP); Takumi Saisu, Yokohama (JP); Hiroyuki Miyata, Tokyo (JP); Kotaro Watanabe, Tokyo (JP)

(73) Assignee: JGC Corporation, Tokyo (JP)

( * ) Notice: Subject to any disclaimer, the term of this patent is extended or adjusted under 35 U.S.C. 154(b) by 515 days.

(21) Appl. No.: 11/915,287

(22) PCT Filed: Jan. 18, 2006

(86) PCT No.: PCT/JP2006/300596

§ 371 (c)(1),
(2), (4) Date: Nov. 21, 2007

(87) PCT Pub. No.: WO2006/129398

PCT Pub. Date: Dec. 7, 2006

(65) Prior Publication Data

US 2009/0100822 A1    Apr. 23, 2009

(30) Foreign Application Priority Data

Jun. 2, 2005   (JP)   ............... 2005-162585

(51) Int. Cl.
F02C 9/00    (2006.01)

(52) U.S. Cl. ..................... 60/39.281; 60/773

(58) Field of Classification Search ............... 60/39.12, 60/39.281, 39.463, 773, 780
See application file for complete search history.

(56) References Cited

U.S. PATENT DOCUMENTS

| 4,442,665 A * | 4/1984 | Fick et al. ............... 60/39.12 |
| 2008/0190092 A1 * | 8/2008 | Osakabe et al. ........... 60/39.12 |

FOREIGN PATENT DOCUMENTS

| JP | 06-257415 | 9/1994 |
| JP | 07-234701 | 9/1995 |
| JP | 2685341 | 8/1997 |
| JP | 11-210412 | 8/1999 |
| JP | 2002-129910 | 5/2002 |

* cited by examiner

*Primary Examiner*—William H Rodríguez
*Assistant Examiner*—Phutthiwat Wongwian
(74) *Attorney, Agent, or Firm*—Leason Ellis LLP

(57) ABSTRACT

A gasification unit provided with a gasification furnace 23 to produce fuel gas production is provided. A combined power generation unit 25 which generates power by rotating a gas turbine and a steam turbine using fuel gas produced in the gasification unit is provided. The combined power generation unit 25 is made operable while fuel change over between fuel gas and an auxiliary fuel as the fuel. A control system is provided in which the degree of opening of a control valve 37 for a flare stack 28 provided in a fuel gas feed line is controlled depending upon the pressure of the fuel gas from the gasification unit when fuel change over from the fuel gas to the auxiliary fuel so as to allow the fuel gas supplied to the combined power generation unit 25 to gradually flare from a flare stack 28 until a flared status that total amount of the fuel gas is reached.

5 Claims, 5 Drawing Sheets

PRIOR ART

INTEGRATED GASIFICATION COMBINED CYCLE AND THE CONTROL METHOD

TECHNICAL FIELD

The present invention relates to an integrated gasification combined cycle where a gasification unit and a combined power generation unit are integrated, and the control method.

This application claims priority from Japanese Patent Application No. 2005-162585, filed on Jun. 2, 2005, in the Japan Patent Office, the disclosure of which is incorporated herein by reference in its entirety.

BACKGROUND ART

Recently, an IGCC (Integrated Gasification Combined Cycle) that includes a gasification unit and a combined power generation unit (combination of a gas turbine and a steam turbine) attracts attention. With the IGCC, heavy metals, sulfur, and the like included in raw materials such as residues and coal becoming as a fuel for a gas turbine are almost removed in the manufacturing process of a synthetic gas, which is used as a clean fuel gas equivalent to a natural gas. Consequently, since the environmental load can be reduced, IGCC is evaluated as environmentally friendly power plants for the next generation highly.

Generally, in such a type of system, the raw materials such as the residues and the coal are gasified in a gasification furnace, then harmful substances are removed therefrom to convert into a clean fuel gas in a gas treatment unit, and this fuel gas is used to generate power in a gas turbine.

In such a system, as the control method thereof, there is a gasification furnace lead control method in which the gasification furnace is controlled so as to produce a necessary amount of fuel gas corresponding to a request on the power generation unit, and the gas turbine is operated using this produced fuel gas. Moreover, there is a turbine lead control method in which a gas turbine is controlled so as to generate a necessary amount of power corresponding to a request of the power load, and a synthetic gas necessary for operating this gas turbine is supplied from the gasification furnace.

However, recently, a cooperative control method is adopted in which, in order to rapidly follow the variation of the power load request, the gasification furnace lead control method and the turbine lead control method are combined to perform a feed-forward control with respect to the gasification furnace.

Hereinafter, a description is given of the cooperative control method.

FIG. 3 is a circuit diagram illustrating a conventional IGCC. As shown in FIG. 3, the IGCC has a gasification process section 1 that gasifies fuels, and a combined power generation process section 2 that generates power by means of a gas turbine using the fuel gas supplied from the gasification process section 1.

A gasification process controller 5 to which a set value is sent from a gas pressure setting device 4 is connected to a fuel control valve 3 provided in the fuel feed line to the gasification process section 1. The fuel control valve 3 is controlled based on a control signal from the gasification process controller 5. The gasification process controller 5 calculates a control value from a measurement signal from a gas pressure instrument 6 that measures the gas pressure in the gasification process section 1 and the set value from the gas pressure setting device 4, and outputs a control signal to the fuel control valve 3.

Moreover, a power generation process controller 9 to which a set value is sent from a power load setting device 8 is connected to a gas control valve 7 provided in the gas feed line to the combined power generation process section 2. The gas control valve 7 is controlled based on a control signal from the power generation process controller 9. The power generation process controller 9 calculates a control value from a measurement signal from a power generation output measurement 10 that measures the power generation output in the combined power generation process section 2 and a set value from the power load setting device 8, and outputs a control signal to the gas control valve 7.

If the cooperative control method is performed in the above IGCC, a feed-forward compensator 11 is provided. The set value is sent from the power load setting device 8 to the feed-forward compensator 11. A feed-forward control signal is sent from the feed-forward compensator 11 to the fuel control valve 3. As a result, the feed rate of fuel that is supplied to the gasification process section 1 is increased or decreased depending upon the variation of the power load request.

That is, in this cooperative control method, it is possible for the gasification in the gasification furnace of the gasification process section 1 to rapidly follow the variation of the power load request.

As conventional technology documents of such a type of control, for example, there are Japanese Unexamined Patent Application, First Publication No. 2002-129910, Japanese Unexamined Patent Application, First Publication No. H 07-234701, Japanese Patent Publication No. 2685341, and Japanese Unexamined Patent Application, First Publication No. H 11-210412.

With an IGCC such as described above, it is necessary to stop the plant operation regularly, and to inspect the facilities. There is a case of shut down maintenance where the overall operation of the IGCC is stopped, and there is a case where, so as to enable stable supply of power, the combined power generation unit is continuously operated and only the gasification unit is stopped.

At this time, in the case of the IGCC having only one gasification unit, an auxiliary fuel such as kerosene is to be supplied to the power generation unit instead of the fuel gas produced in the gasification unit. When switching from the fuel gas to the auxiliary fuel, a highly advanced fuel change over technique is required in which the fuel is continuously changed over from the fuel gas produced in the gasification unit to the auxiliary fuel, while continuously operating the combined power generation unit. Conversely, there is a case where the auxiliary fuel is switched to the fuel gas, and a highly advanced fuel change over technique is similarly required.

In the above fuel change over, it is natural that the combined power generation unit has to be stably operated, that is, the power has to be stably and reliably supplied. At the same time, it is also required to stably operate without imposing an excessive impact on the gasification unit that supplies fuel gas to the combined power generation unit. Moreover, a demand for shortening the time required for this fuel change over operation is also a large factor from an economical viewpoint. Furthermore, making the fuel gas emission to the environment the minimum necessary is a required from the viewpoint of saving energy and minimizing the environmental load.

DISCLOSURE OF INVENTION

The present invention takes the above problems into consideration, with an object of providing an IGCC in which, in fuel change over, not only the combined power generation unit but also the overall unit including the gasification unit can be stably operated.

In particular, an object is to provide an IGCC capable of fuel change over without imposing an excessive impact on the gasification unit.

Moreover, another object is to provide an environmentally friendly IGCC in which fuels can be changed for a short time, and flare gas emission is limited to the necessary minimum.

Furthermore, yet another object is to provide an operation and control method for fuel change over.

MEANS FOR SOLVING THE PROBLEM

The IGCC of the present invention is provided with a gasification unit and a combined power generation unit that uses a gas produced by the gasification unit as a fuel and generates power by rotating a gas turbine and a steam turbine using a fuel gas produced in the gasification unit in the combined power generation unit. The IGCC of the present invention includes a power load control system that controls the combined power generation unit so that the power generation output corresponds to a power load request, a gasification furnace load control system that controls the gasification unit so as to produce fuel gas of an amount corresponding to the power load request, an auxiliary fuel supply device capable of supplying an auxiliary fuel instead of the fuel gas, a flare stack which is connected to a fuel gas feed line and emits the fuel gas as a flare when the pressure of the fuel gas becomes a predetermined pressure or more, and a flare valve that controls a flaring amount emitting from the flare stack, and a control system thereof. The IGCC enables a fuel change over operation from the fuel gas to the auxiliary fuel and from the auxiliary fuel to the fuel gas. In the fuel change over operation, the control system of the flare valve has a dead time compensation circuit that compensates a dead time and a control delay of the gasification unit and the gasification furnace load control system that controls the operation of the gasification unit uses a request of the degree of opening for the flare valve as an advanced signal.

In the present invention, the control system for the flare valve includes a switching device that switches a control signal passing through the dead time compensation circuit of this control system to valid or invalid.

The control method of the present invention is a control method of an IGCC provided with a gasification unit and a combined power generation unit that uses a gas produced by the gasification unit as a fuel and generates power by rotating a gas turbine and a steam turbine using a fuel gas produced in the gasification unit in the combined power generation unit. The control method of the present invention includes a power load control system that controls the combined power generation unit so that the power generation output corresponds to a power load request, a gasification furnace load control system that controls the gasification unit so as to produce fuel gas of an amount corresponding to the power load request, an auxiliary fuel supply device capable of supplying an auxiliary fuel instead of the fuel gas, a flare stack which is connected to a fuel gas feed line and emits the fuel gas as a flare when the pressure of the fuel gas becomes a predetermined pressure or more, and a flare valve that controls the flaring amount emitting from the flare stack, and a control system thereof. The IGCC enables a fuel change over operation from the fuel gas to the auxiliary fuel and from the auxiliary fuel to the fuel gas. In the fuel change over operation, the flare valve is controlled by a signal compensating a dead time and a control delay of the gasification unit and a request of the degree of opening for the flare valve is sent to the gasification furnace load control system that controls the operation of the gasification unit as an advanced signal.

The fuel change over operation (A) of the present invention from the fuel gas to the auxiliary fuel in the fuel change over operation includes:

(1) Normal operation A1: Adding a signal from the power load control system to a signal from the control system that controls the pressure of the fuel gas produced in the gasification unit, and sending to the gasification furnace load control system in order to operate the gasification unit, as well as operating the flare valve for the flare stack in an automatic mode by a signal from the gas pressure control system for the flare valve, so as to supply the total amount of the fuel gas produced by operating the gasification unit corresponding to the power load request;

(2) Fuel change over operation A2: Switching the gas pressure control system for the flare valve from the automatic mode to a manual mode, so as to control the flare valve by the above signal compensating a dead time and a control delay of the gasification unit, as well as sending a signal of the degree of opening of the flare valve as an advanced signal to the gasification furnace load control system, so as to gradually increase the operation load of the gasification unit from zero flared to the level of minimum flared;

(3) Fuel change over operation A3-1: Canceling to send the signal, which is the addition of signals from the gas pressure control system and the power load control system to the gasification furnace load control system and to send the signal of the degree of opening of the flare valve, so as to keep the load of the gasification furnace load control system at a fixed level, as well as returning the control of the gas pressure control system for the flare valve to the automatic mode. The signal compensating a dead time and a control delay of the gasification unit is canceled. The flare valve by a signal, which is an addition of signals from the gas pressure control system for the flare valve and the power load control system is controlled;

(4) Fuel change over operation A3-2: Continuing the same status of the above fuel change over operation A3-1 regarding the flare valve control. While supplying the combined power generation unit with the fuel gas and the auxiliary fuel so that the total amount thereof becomes an equivalent amount corresponding to the power load request, gradually switching the fuel gas from 100% to zero and the auxiliary fuel from zero to 100%;

(5) Fuel change over operation A4: Operating in the same manner as that of the fuel change over operation A3-2 except that, after switching the fuel gas to the 100% auxiliary fuel, the signal from the power load control system to the gas pressure control system for flare valve is cancelled and the flare valve control is performed only by the signal from the gas pressure control system for the flare valve, so as to operate to stop the operation of the gasification unit after a predetermined time.

A fuel change over operation (B) of the present invention from the auxiliary fuel to the fuel gas in the fuel change over operation includes:

(1) Auxiliary fuel operation B1: Supplying the combined power generation unit with auxiliary fuel of an equivalent amount corresponding to the power load request, while on ahead starting the gasification unit so as to be capable of change over to the fuel gas to operate at a fixed load. The flare valve is operated only by the signal from the gas pressure control system for the flare valve;

(2) Fuel change over operation B2-1: Operating in the same manner as that of the auxiliary fuel 100% operation, except that the signal from the power load control system is added to the signal from the gas pressure control system for the flare valve to control the flare valve;

(3) Fuel change over operation B2-2: Continuing the same status of the above change over operation B2-1 regarding the flare valve and gasification unit control, and while supplying the combined power generation unit with the auxiliary fuel and the auxiliary fuel gas so that the total amount thereof becomes an equivalent amount corresponding to the power load request, gradually switching the auxiliary fuel from 100% to zero and the fuel gas from zero to 100%;

(4) Fuel change over operation B3: After switching to the 100% fuel gas, switching the gas pressure control system for the gasification furnace from the manual mode to the automatic mode, and switching the flare valve control system from the automatic mode to the manual mode, so as to control the gasification furnace load by receiving a signal which is an addition of signals from the power load control system and the gas pressure control system for the gasification furnace;

(5) Fuel change over operation B4: Continuously operating the above change over operation B3, except for sending the signal of the degree of opening of the flare valve as an advanced signal to the gasification furnace load control system, as well as controlling the flare valve by the above signal compensating a dead time and a control delay of the gasification unit;

(6) Fuel change over operation B5 (normal operation): Adding the signal from the gas pressure control system for the gasification furnace to the signal from the power load control system and sending to the gasification furnace load control system in order to operate the gasification unit. The combined power generation unit is supplied with the total amount of the fuel gas produced by a normal operation of the gasification furnace in a status corresponding to the power load request. The flare valve for the flare stack is operated in the automatic mode by the gas pressure control signal for the flare valve.

EFFECTS OF THE INVENTION

According to the IGCC of the present invention, since the flare valve control system at the time of a fuel change over operation has a dead time compensation circuit which compensates a dead time and a control delay in the gasification unit, then an excessive operation of the degree of opening of the flare valve can be prevented, and a stable gas pressure can be ensured. Moreover, since a request of the degree of opening for the flare valve is taken as an advanced signal into the gasification furnace control system which controls the overall gasification unit, then the load following capability of the gasification unit at the time of operating the degree of opening of the flare valve can be improved.

BRIEF DESCRIPTION OF THE REFERENCE SYMBOLS

21: Integrated gasification combined cycle
23: Gasification furnace (Gasification unit)
24: Gas treatment unit (Gasification unit)
25: Combined power generation unit
28: Flare stack
34 and 37: Control valve
42: Gasification furnace load controller (control system)
43: Power load controller (control system)
58: Gas pressure controller for gasification furnace (control system)
59: Gas pressure controller for flare valve (control system)
73: Flare valve dead time compensation circuit

BEST MODE FOR CARRYING OUT THE INVENTION

Hereunder is a description of the best mode for carrying out the present invention, with reference to the drawings.

First is a description of an integrated gasification combined cycle to which a cooperative control method serving as a standard for applying the embodiment of the present invention is applied.

Figure 1:
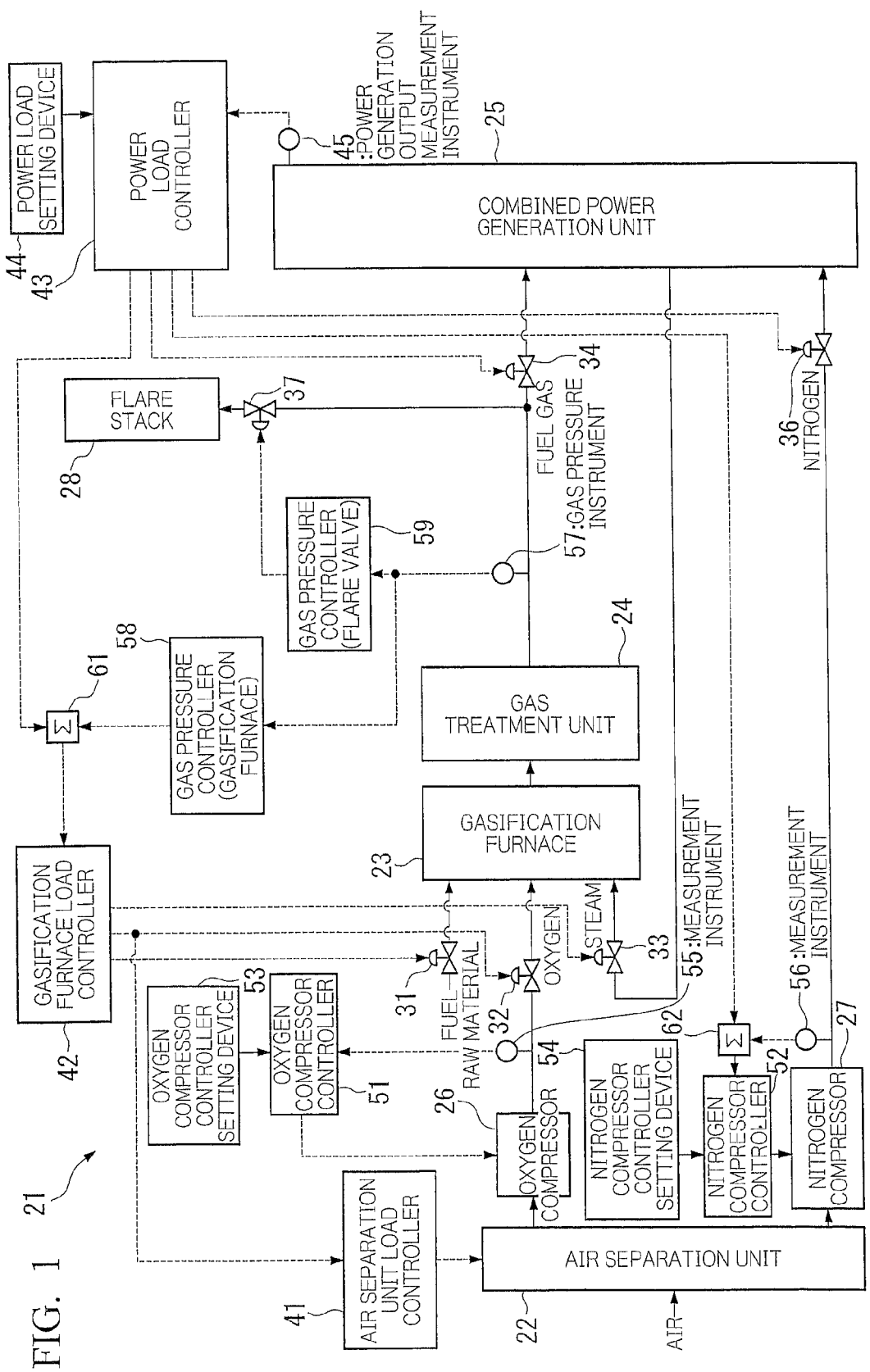
FIG. 1 is a circuit diagram illustrating an IGCC to which a cooperative control method in the conventional technology is applied.
Figure 3:
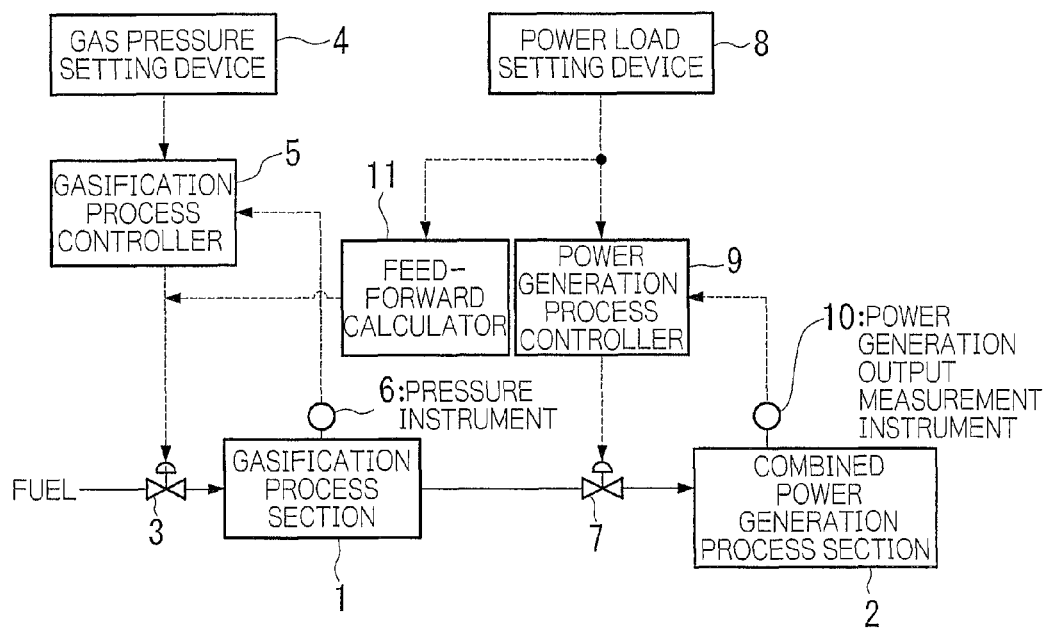
FIG. 3 is a circuit diagram illustrating a conventional IGCC.

FIG. 1 is a circuit diagram illustrating an integrated gasification combined cycle 21 to which a cooperative control method in the conventional technology is applied. FIG. 1 shows a more specific structure of the IGCC to which the cooperative control method, whose principle is shown in FIG. 3, is applied. The structure is described as a comparative example of the present embodiment.

As shown in FIG. 1 the integrated gasification combined cycle 21 includes an air separation unit 22, a gasification furnace 23, a gas treatment unit 24, and a combined power generation unit 25.

The air separation unit 22 separates fed air into oxygen and nitrogen. The oxygen separated by the air separation unit 22 is pressurized by an oxygen compressor 26 and sent to the gasification furnace 23, and the nitrogen is pressurized by a nitrogen compressor 27 and sent to the combined power generation unit 25.

The gasification furnace 23 is supplied with fuel raw materials such as residues and coal and steam from the combined power generation unit 25. Then, the gasification furnace 23 produces non-refined fuel gas having hydrogen and carbon monoxide as main constituents from oxygen, the fuel raw materials and the steam. This non-refined fuel gas is sent to the gas treatment unit 24, and made into a purified fuel gas by dust removal and desulfurization in the gas treatment unit 24. Then the fuel gas is sent to the combined power generation unit 25.

The combined power generation unit 25 includes a gas turbine, a steam turbine, and a power generator. The gas turbine is supplied with the fuel gas from the gas treatment unit 24 that was adjusted to a predetermined concentration by mixing nitrogen from the nitrogen compressor 27. In this gas turbine, the supplied fuel gas is combusted to rotate the turbine. The exhaust from this gas turbine is sent to a boiler. In the boiler, steam is generated by the exhaust heat and the combustion heat of the fuel. This steam is sent to the steam turbine. As a result, the steam turbine converts the supplied steam into kinetic energy, which is the turbine rotation. Then, the power generator is driven by the gas turbine and steam turbine to generate power.

This combined power generation unit 25 can be supplied with an auxiliary fuel such as kerosene from a feed line (not shown), and the gas turbine is made operable with fuel gas or an auxiliary fuel.

A flare stack 28 is connected to the fuel gas line which supplies fuel gas to the combined power generation unit 25. The flare stack 28 is to flare the fuel gas with a purpose of emitting gas to suppress a pressure increase when the gas pressure in the fuel gas line exceeds a specified pressure due to whatever reason.

In the above IGCC 21, the feed line of the fuel raw materials, the oxygen feed line, and the steam feed line to the gasification furnace 23 are respectively provided with control valves 31, 32, and 33, so that the supply amount of fuel raw materials, oxygen and hydrogen to the gasification furnace 23 can be adjusted. Here is a description about the case where the control valves are used as a flow control device. However, a case is also included where, instead of these control valves, the flow is controlled by controlling the number of revolutions of a drive motor of equipment such as a fuel feed pump and a blower.

Moreover, a fuel gas feed line and a nitrogen feed line to the combined power generation unit 25 are respectively provided with control valves 34 and 36, so that the feed rate of fuel gas and nitrogen to the combined power generation unit 25 can be adjusted.

Furthermore, a fuel gas branch line linking to the flare stack 28 is also provided with a control valve 37, so that the flow rate of fuel gas to the flare stack 28 can be adjusted.

Next is a description of the control system of the above IGCC 21. The IGCC 21 includes an air separation unit load controller 41, a gasification furnace load controller 42, and a power load controller 43.

The air separation unit load controller 41 outputs a control signal to the air separation unit 22 for control.

The gasification furnace load controller 42 outputs a control signal to the control valves 31, 32, and 33 provided in the feed line of fuel raw materials, the oxygen feed line, and the steam feed line in order to control these control valves 31, 32, and 33.

Moreover, the gasification furnace load controller 42 also sends a control signal to be sent to the control valve 32 in the oxygen feed line to the air separation unit load controller 41.

A set value is sent from a power load setting device 44 to the power load controller 43. Moreover, detection data of power generation output is sent from a power generation output detector 45 that detects the power generation output in the combined power generation unit 25 to the power load controller 43.

The power load controller 43 outputs a control signal to the control valve 34 in the fuel gas feed line and the control valve 36 in the nitrogen feed line, so as to control these control valves 34 and 36. That is, the power load controller 43 controls the combined power generation unit 25 using the power generation output as a controlled variable. Moreover, the power load controller 43 outputs a control signal to the gasification furnace load controller 42 and a nitrogen compressor controller 52 via adders 61 and 62.

The oxygen compressor 26 is provided with an oxygen compressor controller 51. A set value is sent to an oxygen compressor controller 51 from the oxygen compressor controller setting device 53 and measured data is sent from a measurement instrument 55 that measures the pressure or the flow rate of the oxygen feed line to the gasification furnace 23.

Based on the set value from the oxygen compressor controller setting device 53 and the measured data from the measurement instrument 55, the oxygen compressor controller 51 outputs a feedback control signal to the oxygen compressor 26, so as to control the oxygen compressor 26. As a result, the oxygen compressor 26 is controlled using the downstream pressure or the flow rate as a controlled variable.

The nitrogen compressor 27 is provided with a nitrogen compressor controller 52. A set value is sent to the nitrogen compressor controller 52 from a nitrogen compressor controller setting device 54, and measured data is sent from a measurement instrument 56 that measures the pressure or the flow rate of the nitrogen feed line to the combined power generation unit 25 via the adder 62.

Based on the set value from the nitrogen compressor controller setting device 54 and the additional value of the measured data from the measurement instrument 56 and the control signal from the power load controller 43, the nitrogen compressor controller 52 outputs a control signal to the nitrogen compressor 27 to control the nitrogen compressor 27. As a result, the nitrogen compressor 27 is controlled using the downstream pressure or the flow rate as a controlled variable. The control of the oxygen compressor 26 and the nitrogen compressor 27 can be switched to either pressure control or flow control depending upon the load condition.

A gas pressure instrument 57 that measures the pressure of fuel gas is provided in the fuel gas line which supplies fuel gas to the combined power generation unit 25. The measured data from the gas pressure instrument 57 is respectively sent to a gas pressure controller for a gasification furnace 58 and a gas pressure controller for a flare valve 59.

The gas pressure controller for the gasification furnace 58 outputs a control signal to the adder 61. As a result, the control signals from the gas pressure controller for the gasification furnace 58 and the power load controller 43 are added in the adder 61 and sent to the gasification furnace load controller 42. That is, the gasification furnace 23 is controlled using the pressure of the fuel gas on the downstream side of the gas treatment unit 24 as a controlled variable.

The gas pressure controller for the flare valve 59 outputs a control signal to the control valve 37 in the branch line to the flare stack 28, so as to control the control valve 37. Here, the pressure set value of the gas pressure controller for the flare valve 59 is made slightly higher than that of the gas pressure controller for the gasification furnace 58. As a result, the control valve 37 in the branch line is closed during the normal operation, whereas the control valve 37 in the branch line is opened to flare in the flare stack 28 when the measured value of the gas pressure instrument 57 exceeds the set value of the gas pressure controller for the flare valve 59.

In the integrated gasification combined cycle 21, a control signal from the power load controller 43 based on the set value from the power load setting device 44 is sent as a feed-forward control signal to the gasification furnace load controller 42 via the adder 61.

As a result, based on the signal added with the feed-forward control signal, the gasification furnace load controller 42 controls the control valves 31, 32, and 33 in the fuel raw materials, oxygen, and steam feed lines to the gasification furnace 23 and sends a control signal to the air separation unit load controller 41 to control the air separation unit 22. Consequently, the production rate of the fuel gas in the gasification furnace 23 and the gas treatment unit 24 is increased or decreased depending upon the variation of the power load request.

That is, in the integrated gasification combined cycle 21 to which the cooperative control in this comparative example is applied, the fuel gas production rate with the gasification unit including the gasification furnace 23 and the gas treatment unit 24 can be allowed to rapidly follow the variation of the power load request within a predetermined range.

Moreover, in the integrated gasification combined cycle 21, a control signal from the power load controller 43 based on the set value from the power load setting device 44 is also sent as a feed-forward control signal to the nitrogen compressor controller 52 via the adder 62. As a result, the nitrogen supply amount to the combined power generation unit 25 by the nitrogen compressor 27 can be increased or decreased by rapidly following the variation of the power load request.

In the integrated gasification combined cycle 21 of the comparative example, the feed-forward control to increase or decrease the fuel gas production rate with the gasification furnace 23 and the gas treatment unit 24 depending upon the variation of the power load request is performed. However, in the production equipment of fuel gas with the gasification furnace 23 and the gas treatment unit 24, there are a dead time and a control delay during the time when the fuel gas is being supplied from the gasification unit to the power generation unit.

Here, the dead time means a time in which no result is coming at all since a command (signal) is input into a process or a system. To be more accurate, this is as shown in FIGS. 4A, 4B, and 4C.

Figure 4A:
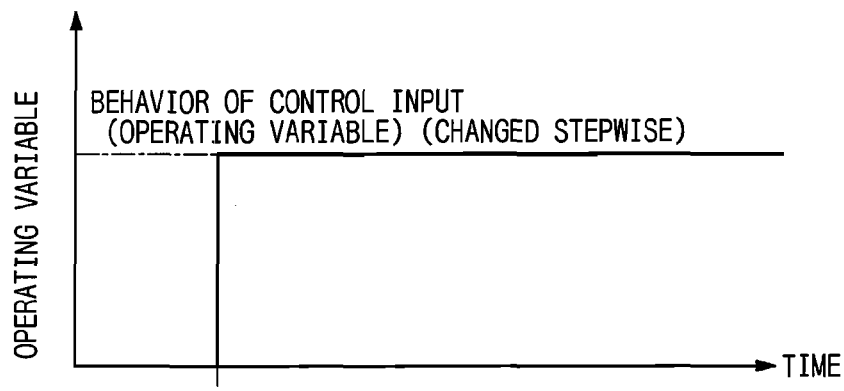
FIG. 4A shows a case where a control input promptly rises.
Figure 4B:
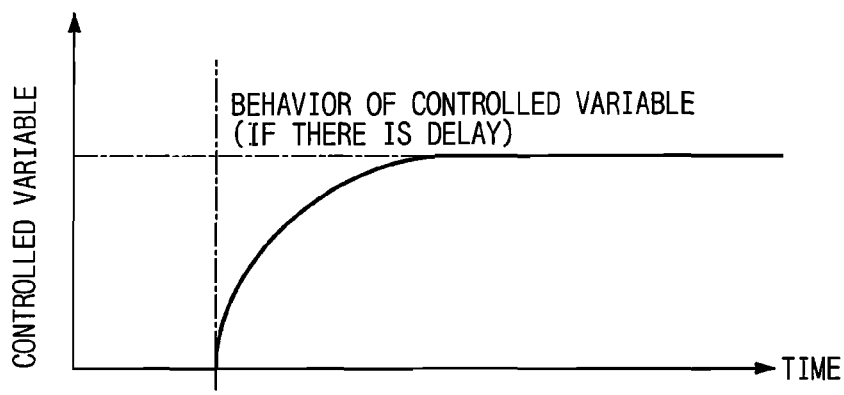
FIG. 4B shows a case where a controlled variable has a delay characteristic with respect to the control input.
Figure 4C:
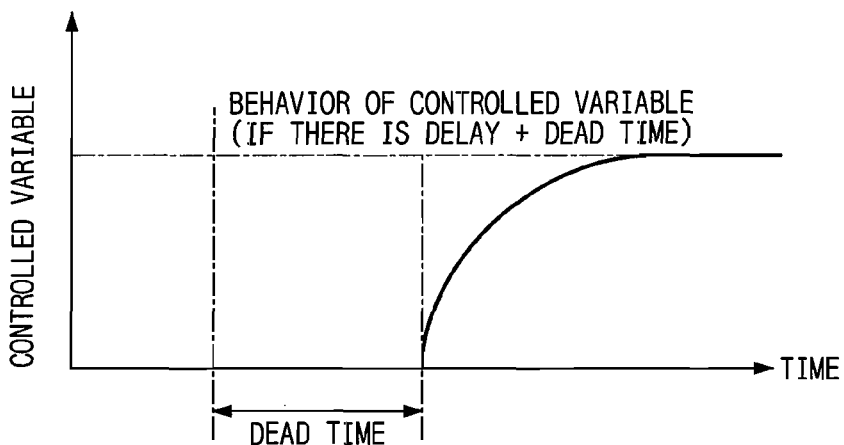
FIG. 4C shows a case where the controlled variable has a dead time and a delay with respect to the control input.

That is, as shown in FIG. 4A, even if a control input (operating variable) promptly rises, generally the behavior of the controlled variable has a delay characteristic as shown in FIG. 4B. If there is further a dead time, the actual behavior of the controlled variable is greatly delayed as shown in FIG. 4C. In the present invention, compensation is performed in the case where there are both dead time and control delay as shown in FIG. 4C.

Figure 2:
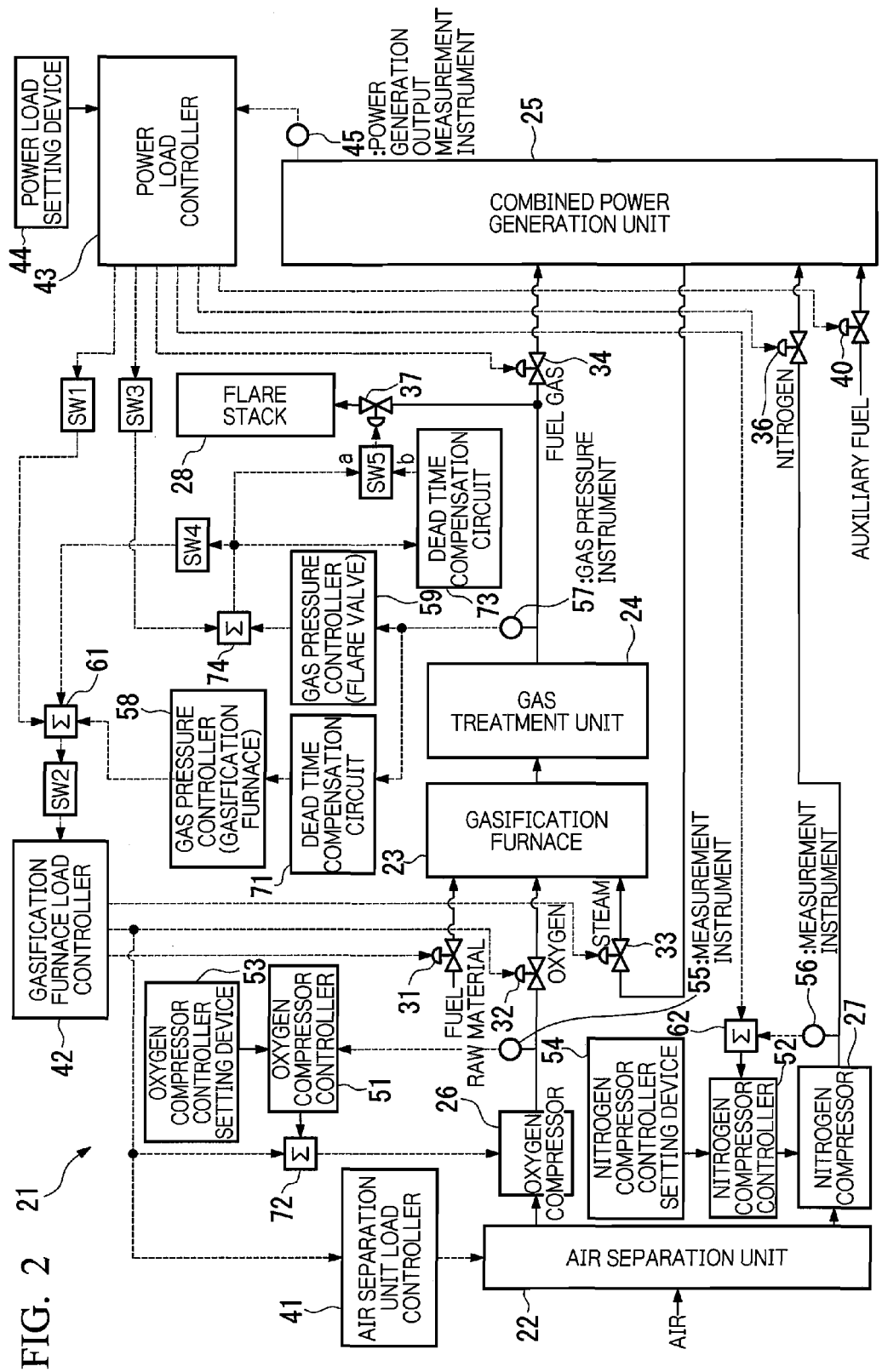
FIG. 2 is a circuit diagram illustrating an IGCC according to an embodiment of the present invention.

FIG. 2 shows a circuit diagram illustrating the IGCC according to the embodiment of the present invention.

Since there are both dead time and control delay, as shown in FIG. 2, the present embodiment includes a dead time compensation circuit that compensates the dead time and the control delay described above, in addition to the above cooperative control method of FIG. 1. That is, the structure is such that a dead time compensation circuit 71 is built-in between the gas pressure instrument 57 and the gas pressure controller for the gasification furnace 58.

By this dead time compensation circuit 71, an increase or a decrease of fuel gas produced corresponding to the power load request is measured as an increase or a decrease of pressure, and even if the deviation is large, a psuedo signal to reduce the manipulation amount as if the deviation were small is output to the gas pressure controller for the gasification furnace 58. As a result, even if the variation of power load request is large, the fuel gas production rate with the gasification furnace 23 can be stabilized and the following capability with respect to the variation of the power load request can be further improved.

In the case where the fuel gas production rate with the gasification furnace 23 and the gas treatment unit 24 is to be increased or decreased depending upon the variation of the power load request by the above feed-forward control, the feed rate of oxygen required for the fuel gas must also be increased or decreased.

Therefore, in the present embodiment, there is provided an adder 72 that adds a control signal from the gasification furnace load controller 42 to a control signal from the oxygen compressor controller 51 and sends it to the oxygen compressor 26. As a result, a control signal from the gasification furnace load controller 42 that has been sent based on a feed-forward control signal from the power load controller 43 is added to a control signal from the oxygen compressor controller 51 as a feed-forward signal and the oxygen compressor 26 is controlled by the control signal.

That is, the oxygen compressor 26 can be rapidly controlled with respect to an increase or a decrease of the fuel gas production rate with the gasification furnace 23 and particularly the feed rate of oxygen which significantly affects the temperature change in the gasification furnace 23 can be stabilized for supply depending upon the load of the gasification unit including the gasification furnace 23 and the gas treatment unit 24.

Moreover, the feed rate of oxygen required for the fuel gas production in the gasification unit including the gasification furnace 23 and the gas treatment unit 24 can be realized further stable supply depending upon the load of the gasification unit including the gasification furnace 23 and the gas treatment unit 24.

In the above embodiment, the configuration of the facilities is assumed that an air separation unit exclusively for this power generation system is provided to control the feed rate of oxygen or nitrogen from this air separation unit. However, the configuration may be to control a flow control device for receiving the feed rate of oxygen or nitrogen from an air separation unit which were established in order to share it with other facilities.

In the above control system of the integrated gasification combined cycle 21, an adder 74 is provided in a transmission line of control signal from the gas pressure controller for the flare valve 59 to the control valve 37. A feed-forward control signal is sent from the power load controller 43 to this adder 74, where the command value is added to a control signal from the gas pressure controller for the flare valve 59 and is sent to the control valve 37.

The control system of the integrated gasification combined cycle 21 includes switches SW1, SW2, SW3, and SW4 serving as ON/OFF switches, a switch SW5 serving as a selector switch, and a flare valve dead time compensation circuit 73.

The switch SW1 is provided in the transmission line of control signal from the power load controller 43 to the adder 61. The switch SW2 is provided in the transmission line of control signal from the adder 61 to the gasification furnace load controller 42. The switch SW3 is provided in the transmission line of control signal from the power load controller 43 to the adder 74. Middle of along the transmission line of control signal from the gas pressure controller for the flare valve 59 to the control valve 37 is provided a transmission line linking to the adder 61. The switch SW4 is provided in this transmission line.

The flare valve dead time compensation circuit 73 is provided in parallel with the transmission line of control signal from the gas pressure controller for the flare valve 59 to the control valve 37. In this flare valve dead time compensation circuit 73, a control signal is input from the gas pressure controller for the flare valve 59 and this control signal is subjected to arithmetic processing and sent to the control valve 37. A transmission line of control signal to be sent from the gas pressure controller for the flare valve 59 via the adder 74 to the control valve 37 and a transmission line of control signal to be sent from the flare valve dead time compensation circuit 73 to the control valve 37 are connected to the switch SW5.

Since the switch SW5 alternatively sends a control signal from either one of these transmission lines to the control valve 37, it can be switched to either one of a-side or b-side. In the case of a-side, a control signal sent from the gas pressure controller for the flare valve 59 via the adder 74 is sent to the control valve 37. In the case of b-side, a control signal from the flare valve dead time compensation circuit 73 is sent to the control valve 37.

The power load controller 43 sends a control signal to the control valve 40 provided in the feed line that supplies an auxiliary fuel such as kerosene to the combined power generation unit 25 to control the control valve 40. The control valve 40 is closed during the normal operation with fuel gas.

In the integrated gasification combined cycle 21, as shown in Table 1, during the normal operation with fuel gas, when the SW pattern is pattern 0, the switches SW1 and SW2 are ON, the switches SW3 and SW4 are OFF, and the switch SW5 is on the a-side, and thereby the operation with the feed-forward control mentioned above is performed.

TABLE 1

| SW pattern | Operation status | SW1 | SW2 | SW3 | SW4 | SW5 |
|---|---|---|---|---|---|---|
| Pattern 0 | Normal operation | ON | ON | OFF | OFF | a-side |
| Pattern 1 | Fuel change over (1) | ON | ON | OFF | ON | b-side |
| Pattern 2 | Fuel change over (2) | OFF | OFF | ON | OFF | a-side |
| Pattern 3 | Fuel change over (3) | OFF | OFF | OFF | OFF | a-side |

In the integrated gasification combined cycle 21, it is necessary to regularly replace a burner provided in the gasification furnace 23 that gasifies raw materials such as residue a and coal slurry. In this case, the gasification unit is to be temporarily stopped.

Consequently, in the integrated gasification combined cycle 21, when this gasification unit is stopped, the fuel for the gas turbine of the combined power generation unit 25 is changed over from fuel gas from the gasification unit to an auxiliary fuel such as kerosene. After the burner is replaced, it is returned by changeover from the auxiliary fuel to fuel gas from the gasification unit.

Next is a description of the change over of fuels for the combined power generation unit 25 in the integrated gasification combined cycle 21 of the above embodiment with reference to Table 1.

(Change Over from Fuel Gas to Auxiliary Fuel)

(1) Firstly, from the normal operation status of pattern 0, the gas pressure controller for the flare valve 59 is switched from an automatic mode to a manual mode. Then, the switch SW4 is turned ON and the switch SW5 is switched from a-side to b-side to give the operation status of the fuel change over (1) of pattern 1.

Figure 5A:
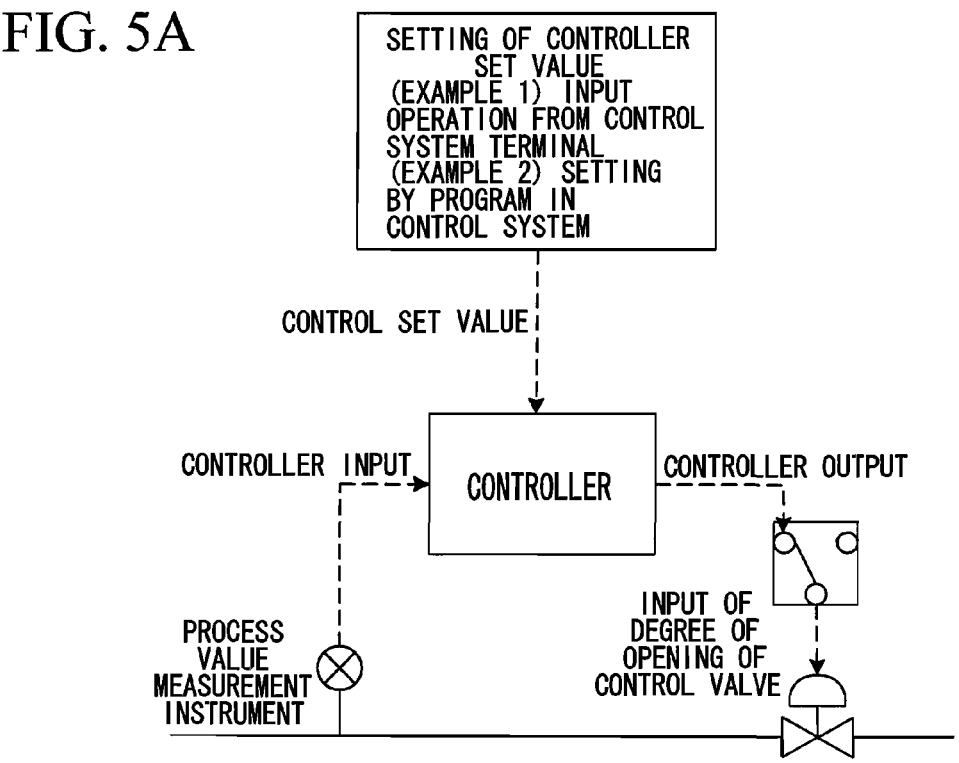
FIG. 5A illustrates an automatic mode of a control method in the present invention.
Figure 5B:
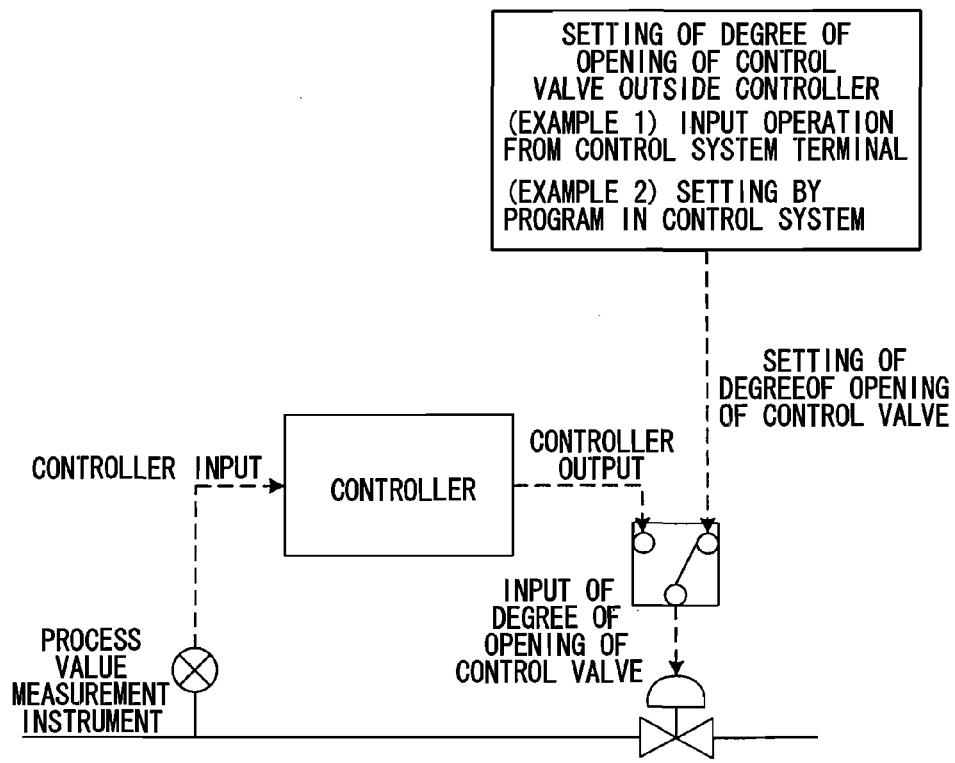
FIG. 5B illustrates a manual mode of the control method in the present invention.

FIG. 5A illustrates the automatic mode of the control method in the present invention and FIG. 5B illustrates the manual mode of the control system in the present invention.

Here, a description is given of the automatic mode and the manual mode with reference to FIG. 5A and FIG. 5B.

As shown in FIG. 5A, the automatic mode is a method in which a process value such as a pressure is input into a controller having a control function such as PID control and calculation is automatically performed based on a deviation between this process value and a set value that is preset in the controller to control so that the output value of the controller is used as the set value of the degree of opening of the control valve. This is a typical controller control method.

On the other hand, as shown in FIG. 5B, the manual mode is a method in which the output value of the controller in the automatic mode is not adopted and a set value from outside of the controller such as an arbitrary value directly input from a control system terminal by a person or an arbitrary value obtained by calculation of a separately prepared program is directly used as the degree of opening of the control valve to operate the control valve.

(2) In this status, the control valve 37 is gradually opened from the completely closed status at the time of normal operation by the gas pressure controller for the flare valve 59 in the manual mode to perform flaring in the flare stack 28.

At this time, it is necessary to increase the load of the gasification furnace 23 for the flaring amount. Here, since the switch SW4 is ON, the control signal serving as the command for degree of opening to the control valve 37 is added as the feed-forward control signal in the adder 61 and sent to the gasification furnace load controller 42. As a result, in the gasification furnace 23, the load for the flaring amount in the flare stack 28 is precedingly increased.

The control signal from the gas pressure controller for the flare valve 59 is sent to the control valve 37 via SW5 to the control valve 37 after the dead time and the control delay in the gasification unit including the gasification furnace 23 and the gas treatment unit 24 has been compensated by the flare valve dead time compensation circuit 73. As a result, a condition in which the control valve 37 is opened to quickly and causes a sudden decrease in the pressure of the fuel gas can be reliably prevented, and the opening operation of the control valve 37 can be performed always in a stable manner.

(3) When the control valve 37 is opened to a predefined degree of opening, the switches SW1, SW2, and SW4 are turned OFF, the switch SW3 is turned ON, and the switch SW5 is switched to a-side to give the operation status of the fuel change over (2) of pattern 2. At the same time, the gas pressure controller for the flare valve 59 is switched from the automatic mode to the manual mode.

As a result, control signals from the power load controller 43 and the gas pressure controller for the gasification furnace 58 are not sent to the gasification furnace load controller 42, and controlled under condition that the load in the gasification unit including the gasification furnace 23, and the gas treatment unit 24 is constant.

A feed-forward control signal from the power load controller 43 sent via the switch SW3 in the ON status is added to a control signal serving as the command for degree of opening from the gas pressure controller for the flare valve 59 and sent to the control valve 37 as the command for degree of opening. That is, it is sent to the control valve 37 as the feed-forward control signal from the power load controller 43.

As a result, in the control valve 37, the degree of opening is adjusted by promptly following the command for flow rate of the fuel gas to the combined power generation unit 25 at the time of fuel change over described later.

(4) By the control signal from the power load controller 43, the control valve 34 in the fuel gas feed line, the control valve 36 in the nitrogen feed line, and the control valve 40 in the auxiliary fuel feed line are controlled and changed over the fuel gas and the auxiliary fuel.

Here, the value of the command for fuel gas flow which is serving as the control signal from the power load controller 43 is gradually decreased and the control valve 34 in the fuel gas feed line is gradually closed. At the same time, in order to avoid the pressure increase of fuel gas, the degree of opening of the control valve 37 in the branch line is gradually increased and finally the total amount of the fuel gas produced in the gasification unit is flared in the flare stack 28. Then, the degree of opening of the control valve 40 is increased and the fuel gas is changed over to the auxiliary fuel.

(5) In the status where the total amount of the fuel gas is flared in the flare stack 28, the switch SW3 is turned OFF to give the operation status of the fuel change over (3) of pattern 3. As a result, the feed-forward control signal from the power load controller 43 is not added to the control signal from the gas pressure controller for the flare valve 59.

In this manner, in case of change over the fuel gas to the auxiliary fuel, since the flared status is appeared from a no-flared (zero flared) status, firstly the control valve 37 for the flare stack 28 is opened in the manual mode to a predefined degree of opening and then the control valve 34 in the fuel gas feed line to the combined power generation unit 25 is gradually closed and concurrently the control valve 37 for the flare stack 28 is gradually opened to finally give the status that total amount of fuel gas is flared.

(Change Over from Auxiliary Fuel to Fuel Gas)

(1) The switch SW3 is turned ON to give the operation status of the fuel change over (2) of pattern 2 from the operation status of the fuel change over (3) of pattern 3 where the switches SW1, SW2, SW3 and SW4 are turned OFF and the switch SW5 is on a-side at a fixed load: the operation status where the feed-forward control signal from the power load controller 43 is not added to the control signal from the gas pressure controller for the flare valve 59 in the automatic mode but directly sent to the control valve 37 to control the control valve 37 and to control the pressure of the fuel gas.

As a result, the feed-forward control signal from the power load controller 43 is added to the control signal from the gas pressure controller for the flare valve 59 in the automatic mode enabling control of the control valve 37 rapidly corresponding to the power load request.

(2) Next, by the control signal from the power load controller 43, the control valve 34 in the fuel gas feed line, the control valve 36 in the nitrogen feed line, and the control valve 40 in the auxiliary fuel feed line are controlled to change over the auxiliary fuel to the fuel gas.

When the degree of opening of the control valve 34 in the fuel gas feed line is gradually increased during fuel, change over the control valve 37 for the flare stack 28 is gradually closed in order to keep the pressure of the fuel gas at a fixed level.

(3) The fuel gas production rate is increased to a predetermined flow rate at which the gas turbine of the combined power generation unit 25 reaches the load of fuel change over and a small amount of fuel gas is flared from the flare stack 28. At this point, the load of the gasification furnace 23 is set so that a small amount of fuel gas is flared from the flare stack 28.

(4) Next, the gas pressure controller for the flare valve 59 is switched from the automatic mode to the manual mode, the switches SW1 and SW2 are turned ON, and the switch SW3 is turned OFF in order to give the normal operation status of pattern 0.

As a result, the gasification unit including the gasification furnace 23 and the gas treatment unit 24 is in status of the load control with flaring from the flare stack 28.

(5) In this status, the degree of opening of the control valve 37 is gradually decreased by the gas pressure controller for the flare valve 59 in the manual mode and is finally entirely closed in order to give the zero flared status with no flaring from the flare stack 28.

At this time, the gasification unit receives the feed-forward control signal from the power load controller 43 in order to perform load control. As a result, the fuel gas is kept at a stable gas pressure.

(6) At the time when the zero flared status with no flaring from the flare stack 28 results, the gas pressure controller for the flare valve 59 is switched from the manual mode to the automatic mode in order to give the complete normal operation status.

The set value serving as the control signal to be sent to the control valve 37 at this time is set slightly higher than the set value of the gas pressure controller for the gasification furnace 58 and the status is set so that the emergency flaring can be performed in the flare stack 28 even if the pressure of the fuel gas is abnormally increased.

In this manner, in the case of fuel change over from the auxiliary fuel to the fuel gas that total amount of the fuel gas is flaring, while the fuel gas supplied to the gas turbine of the combined power generation unit 25 by fuel change over, the amount of the flaring of the fuel gas is gradually reduced. Finally the control valve 37 for the flare stack 28 is entirely closed in the manual mode in order to give the zero flared status.

In this manner, according to the integrated gasification combined cycle 21 according to the above embodiment, when change over from the fuel gas to the auxiliary fuel, there is provided a control system which controls the degree of opening of the control valve 37 for the flare stack 28 provided in the fuel gas feed line depending upon the pressure of the fuel gas from the gasification unit including the gasification furnace 23 and the gas treatment unit 24, and allows the fuel gas supplied to the combined power generation unit 25 to gradually flare from the flare stack 28 until the status that total amount of the fuel gas is flared is reached. Therefore, the supply of fuel gas to the combined power generation unit 25 can be smoothly stopped and the fuel gas can be changed over to the auxiliary fuel without excess emission of the fuel gas from the flare stack 28. As a result, when fuel changing over from the fuel gas to the auxiliary fuel, the power generation unit can be stably operated without imposing an excessive impact on the gasification unit. The time required can be shortened and the fuel gas emission on the environment can be limited to the necessary minimum.

Moreover, when fuel changing over from the auxiliary fuel to the fuel gas, there is provided a control system which controls the degree of opening of the control valve 37 for the flare stack 28 depending upon the pressure of the fuel gas from the gasification unit and gradually closes down the flaring until the fuel gas that had been flared of all from the flare stack 28 is no longer flared. Therefore, the fuel gas can be smoothly supplied to the combined power generation unit 25 and it can be changed over from the auxiliary fuel to the fuel gas without excess emission of the fuel gas from the flare stack 28. As a result, when fuel changing over from the auxiliary fuel to the fuel gas, the power generation unit can be stably operated without imposing an excessive impact on the gasification unit, the time required can be shortened, and the fuel gas emission to the environment can be limited to the necessary minimum.

Furthermore, there is provided a flare valve dead time compensation circuit 73 which compensates the dead time and the control delay in the gasification unit applied to the control signal sent to the control valve 37 for the flare stack 28 depending upon the pressure of the fuel gas from the gasification unit. Therefore, at the time of fuel change over in the combined power generation unit 25, a stable gas pressure can be ensured and undesired situations such as excess emission of the fuel gas from the flare stack 28 can be avoided by preventing an excessive operation of the degree of opening of the control valve 37 for the flare stack 28 due to the dead time and the control delay in the gasification unit. Moreover, since a request of the degree of opening for the flare valve is taken as an advanced signal into the gasification furnace control system which controls the overall gasification unit, the load following capability at the time of operating the degree of opening of the flare valve can be improved.

INDUSTRIAL APPLICABILITY

The present invention can be applied so that the operation can be stably performed without imposing an excessive impact on the gasification unit in the case of fuel change over for an integrated gasification combined cycle.

The invention claimed is:

1. An integrated gasification combined cycle provided with a gasification unit and a combined power generation unit that uses a gas produced in the gasification unit as a fuel and generates power by rotating a gas turbine and a steam turbine using a fuel gas produced in the gasification unit, in the combined power generation unit comprising:
   a power load control system that controls the combined power generation unit so that the power generation output corresponds to a power load request;
   a gasification furnace load control system that controls the gasification unit so as to produce fuel gas with a production rate corresponding to the power load request;
   an auxiliary fuel supply device capable of supplying an auxiliary fuel instead of the fuel gas;
   a flare stack which is connected to a fuel gas feed line and emits the fuel gas as a flare when the pressure of the fuel gas becomes a predetermined pressure or more; and
   a flare valve that controls a flaring amount emitting from said flare stack and a control system thereof; wherein
   the integrated gasification combined cycle enables a fuel change over operation from the fuel gas to the auxiliary fuel and from the auxiliary fuel to the fuel gas;
   in the fuel change over operation, the control system of the flare valve has a dead time compensation circuit that compensates a dead time and a control delay of the gasification unit and the gasification furnace load control system that controls the operation of the gasification unit uses a request of the degree of opening for said flare valve as an advanced signal.

2. The integrated gasification combined cycle according to claim 1, wherein the control system for the flare valve includes a switching device that switches a control signal passing through said dead time compensation circuit of the control system to valid or invalid.

3. A control method for an integrated gasification combined cycle provided with a gasification unit and a combined power generation unit that uses a gas produced in the gasification unit as a fuel and generates power by rotating a gas turbine and a steam turbine using a fuel gas produced in the gasification unit, in the combined power generation unit comprising, the control method comprising the steps of:
   controlling the combined power generation unit using a power load control system so that the power generation output corresponds to a power load request;
   controlling the gasification unit using a gasification furnace load control system so as to produce fuel gas with a production rate corresponding to the power load request; and
   controlling a flaring amount emitted from a flare stack using a flare valve, the flare stack being connected to a fuel gas feed line and capable of emitting the fuel gas as a flare when a pressure of the fuel gas reaches a predetermined pressure or more;
   performing a fuel change over operation of the integrated gasification combined cycle from the fuel gas to the auxiliary fuel and from the auxiliary fuel to the fuel gas;
   in the fuel change over operation, controlling the flare valve by a signal compensating a dead time and a control delay of the gasification unit, and sending a request for the degree of opening of the flare valve to said gasification furnace load control system that controls the operation of the gasification unit as advanced signal.

4. The control method of the integrated gasification combined cycle according to claim 3, wherein, the fuel change over operation (A) from the fuel gas to the auxiliary fuel in said fuel change over operation comprises:
   (1) normal operation A1: adding a signal from the power load control system to a signal from a control system that controls the pressure of the fuel gas produced in the gasification unit, and sending to the gasification furnace load control system in order to operate the gasification unit, as well as operating the flare valve for the flare stack in an automatic mode by a signal from the gas pressure control system for the flare valve, so as to supply a total amount of the fuel gas produced by operating the gasification unit corresponding to the power load request;
   (2) fuel change over operation A2: switching the gas pressure control system for the flare valve from the automatic mode to a manual mode, so as to control the flare valve by the signal compensating the dead time and the control delay of the gasification unit, as well as sending a signal of the degree of opening of the flare valve as the advanced signal to the gasification furnace load control system, so as to gradually increase the operation load of the gasification unit from zero flared to a level of minimum flared;
   (3) fuel change over operation A3-1: canceling sending of a the signal, which is the addition of signals from the gas pressure control system and the power load control system, to the gasification furnace load control system and sending the signal of the degree of opening of the flare valve, so as to keep the load of the gasification furnace load control system at a fixed level, as well as returning the control of the gas pressure control system for the flare valve to the automatic mode, cancelling the signal compensating the dead time and the control delay of the gasification unit, and controlling the flare valve by a signal, which is an addition of signals from the gas pressure control system for flare valve and the power load control system;
   (4) fuel change over operation A3-2: continuing the same status of the fuel change over operation A3-1 regarding the flare valve control, while supplying the combined power generation unit with the fuel gas and the auxiliary fuel so that the total amount thereof becomes an equivalent amount corresponding to the power load request, gradually change over the fuel gas from 100% to zero and the auxiliary fuel from zero to 100%;
   (5) fuel change over operation A4: operating in the same manner as that of the fuel change over operation A3-2 except that, after fuel change over the fuel gas to the 100% auxiliary fuel, the signal from the power load control system to the gas pressure control system for flare valve is cancelled and the flare valve control is performed only by the signal from the gas pressure control system for flare valve, so as to operate to stop the operation of the gasification unit after a predetermined time.

5. The control method of the integrated gasification combined cycle according to claim 3, wherein, in said fuel switching operation, the fuel change over operation (B) from the auxiliary fuel to the fuel gas comprises:

(1) auxiliary fuel operation B1: supplying the combined power generation unit with auxiliary fuel of an equivalent amount corresponding to the power load request, while ahead of starting the gasification unit so as to be capable of change over to the fuel gas to operate at a fixed load, and the flare valve is operated only by the signal from the gas pressure control system for flare valve;

(2) fuel change over operation B2-1: operating with 100% auxiliary fuel, except for that the signal from the power load control system is added to the signal from the gas pressure control system for the flare valve to control the flare valve;

(3) fuel change over operation B2-2: continuing the same status of the change over operation B2-1 regarding the flare valve and gasification unit control, and while supplying the combined power generation unit with the auxiliary fuel and the auxiliary fuel gas so that a total amount thereof becomes an equivalent amount corresponding to the power load request, gradually change over the auxiliary fuel from 100% to zero and the fuel gas from zero to 100%;

(4) fuel change over operation B3: after fuel change over to the 100% fuel gas, switching the gas pressure control system for the gasification furnace from the manual mode to the automatic mode, and switching the flare valve control system from the automatic mode to the manual mode, so as to control the gasification furnace load by receiving a signal which is an addition of signals from the power load control system and the gas pressure control system for gasification furnace;

(5) fuel change over operation B4: continuously operating the fuel change over operation B3, except for sending the signal of the degree of opening of the flare valve as an advanced signal to the gasification furnace load control system, as well as controlling the flare valve by the signal compensating a dead time and a control delay of the gasification unit;

(6) fuel change over operation B5: adding the signal from the gas pressure control system for the gasification furnace to the signal from the power load control system and sending to the gasification furnace load control system in order to operate the gasification unit, and the combined power generation unit is supplied with the total amount of the fuel gas produced by a normal operation of the gasification furnace in a status corresponding to the power load request, and the flare valve for the flare stack is operated in the automatic mode by the gas pressure control signal for the flare valve.

* * * * *